United States Patent [19]
Lection et al.

[11] Patent Number: 6,052,123
[45] Date of Patent: Apr. 18, 2000

[54] ANIMATION REUSE IN THREE DIMENSIONAL VIRTUAL REALITY

[75] Inventors: David Bruce Lection; Kevin Baker Sizer, both of Raleigh, N.C.

[73] Assignee: International Business Machines Corporation, Armonk, N.Y.

[21] Appl. No.: 08/856,465

[22] Filed: May 14, 1997

[51] Int. Cl.[7] .................................................. G06T 17/20
[52] U.S. Cl. ............................................................ 345/419
[58] Field of Search ..................... 345/419, 433, 345/437–439, 473–475

[56] References Cited

U.S. PATENT DOCUMENTS

| | | | |
|---|---|---|---|
| 5,608,850 | 3/1997 | Robertson | 345/427 |
| 5,880,733 | 3/1999 | Horvitz et al. | 345/355 |

*Primary Examiner*—Mark R. Powell
*Assistant Examiner*—Thu Nguyen
*Attorney, Agent, or Firm*—Myers Bigel Sibley & Sajovec; Jeanine S. Ray-Yarletts

[57] ABSTRACT

Methods, systems and computer program products are provided which display an animation in a three dimensional virtual environment by associating the animation with a parent transform such that the geometry of the animation is transformed so that the animation is viewed from a predefined point of view with respect to a user in the three dimensional virtual environment. The animation may, optionally, be played for the user when the user is located in a predefined area of the three dimensional virtual environment. Preferably, the predefined point of view is facing the user. In a VRML embodiment of the present invention, the parent transform is a VRML billboard transform such that a VRML billboard node is created utilizing an animation as a child to the billboard node.

12 Claims, 4 Drawing Sheets

ANIMATION REUSE IN THREE DIMENSIONAL VIRTUAL REALITY

FIELD OF THE INVENTION

The present invention relates to virtual reality and more particularly to animations in virtual reality such as in a three dimensional web page on the Internet.

BACKGROUND OF THE INVENTION

The Internet is a decentralized network of computers that can communicate with one another via the TCP/IP (transmission control protocol/internet protocol) network protocol. Although the Internet has its origins in an agency started by the United States Department of Defense in the late 1960's called the U.S. Advanced Research Project Agency (ARPANET), it has only recently become a worldwide communication medium. To a large extent, the explosive growth in use and traffic over the Internet is due to the development in the early 1990's of the worldwide web (WWW), which is one of several service facilities provided on top of the Internet. Other facilities include a variety of communication services such as electronic mail, telnet, usenet newsgroups, internet relay chat (IRC), a variety of information search services such as WAIS and Archie, and a variety of information retrieval services such as FTP (file transfer protocol) and Gopher. While these facilities have serviced the research-oriented user well, the multimedia capability of the WWW has brought the Internet into prominence.

The WWW is a client-server based facility that includes a number of servers (e.g., computers connected to the Internet) on which web pages or files reside and clients (e.g., web browsers) which interface the users with the web pages. Specifically, web browsers and software applications such as WebExplorer® (IBM Corporation) or Navigator® (Netscape Communication Corporation) send a request over the WWW to a server requesting a web page identified by a universal resource locator (URL) which notes both the server where the web page resides and the file or files on that server which comprise the web page. The server then sends a copy of the requested file(s) to the web browser which displays the web page to the user. The web pages on the WWW may be hyper-media documents written in a standardized language called hypertext markup language (HTML). Thus, a typical web page includes text together with embedded formatting commands, referred to a tags, which can be used to control the font size, the font style (for example, whether italic or bold), how to weigh up the text, and so on. A web browser parses the HTML script in order to display the text in accordance with the specified format. In addition, an HTML page can also contain a reference, in terms of another URL, to a piece of multimedia data, for example, an image, a video segment, or an audio file. The web browser responds to such a reference by retrieving and displaying or playing the data. Alternatively, such multimedia data may form its own web page, without any surrounding HTML text. Further information about HTML and the WWW can be found in World Wide Web and HTML by Douglas MacArthur, pp. 18–26 and *Dr. Dobbs' Journal*, December 1994, and in *The HTML Sourcebook* by Ian Graham, John Wiley Publishers, New York (1995).

Out of an effort to heighten the sensory experience of the WWW, virtual reality modeling language (VRML, pronounced "VER-MEL") was developed. VRML is a standardized language for describing animation and three dimensional modeling of geometric objects. VRML allows a three dimensional scene or world(s) to be manipulated in an interactive manner over the Internet or locally. In either case VRML allows for the creation of virtual environments which may be shared by multiple users. Thus, unlike HTML which provides for relaying and formatting text and images, and for hyperlinks to other web pages, VRML provides for the organization of three dimensional objects and scenes in a hierarchical fashion that may be truly interactive.

A VRML virtual world may include any number of three dimensional objects. A VRML virtual environment may also contain animations are three dimensional animation geometry and movement associated with the animation geometry. The animation may carry out its movement without further user intervention once the animation has been started. Animations may be started by any number of user inputs or may be continuously played to the user.

A VRML browser is used to view a three dimensional world or virtual environment. The VRML browser may be a helper program or plug-in to a web browser that is launched when the web browser detects that the file being downloaded is a VRML document. The VRML browser provides means for allowing the user to move around or navigate the three dimensional virtual world. Typical navigation controls for a VRML browser include walk, spin, look, slide, and point. As well known in the art, the walk control allows the user to move forward and backward within a world, the spin control allows the user to turn in an arcuate fashion, the look control allows the user to zoom in on a particular area or pan out, the slide control allows the user to move sideways in an arcuate fashion, and the point control allows the user to return to an initial vantage point.

In addition to navigating through a VRML world, a user (client) may share a world with one or more other users. In this context, a user selects a three dimensional representation of themselves known as an "avatar" which is an object or group of objects. The avatar then navigates in its world with other avatars that represent other clients (e.g., other VRML browsers). Thus, as a user's avatar moves through the world, the user is able to see other users' avatars moving as well, and vice versa. The navigation controls utilized in conjunction with an avatar are typically the same as those described above.

The positions of a user or a user's avatar within a VRML world are tracked by a matrix-based central object server. Thus, as the position or behavior of an avatar changes, the changes are detected by a server and rebroadcast out to the other browsers. As is known in the industry, the current navigational controls typically allow for movement of the avatar with 6° of freedom. Particularly, current navigational controls allow the user to traverse the world in the direction of the x, y, or z axis.

One problem with virtual environments occurs in the use of animations in the virtual environment. Because a user may view a three dimensional animation from any number of points of view the animation should be oriented to the viewpoint of the user to reduce anomalous appearance in the virtual environment. Utilizing traditional animation methods orienting an animation to all the possible user points of view may require a copy oriented to a specific viewpoint of the animation for each possible viewpoint. If the animation and the user's viewpoint are not properly oriented then anomalous views may result which reduce the realism of the virtual environment. For example, in a virtual environment where a bartender serves drinks to users, if the point of view of the user is not properly oriented with the animation of the bartender then the bartender may serve a drink to a location in the virtual environment other than the users. Thus, the bartender could hand a drink to empty space or a location on a virtual bar other than the users. However, replication of animations to solve such anomalous behavior may be impractical as a result of the amount of programming time required to create such animations or the amount of information required to store or transfer numerous animations.

One method of overcoming the limitations of a fixed point of view animation is to limit the locations in the virtual environment where the animation may be played. Thus, in the bartender example, the bartender could be limited to only serving drinks to users who were located in the virtual environment in an orientation which was aligned with the bartender animation. This constraint on which an animation can be played would tend to assume that the user viewpoint and the animation were properly oriented. Such a solution may prevent the anomalous views which may result from use of a mis-oriented animation but also places constraints on the virtual environment which may reduce the realism and flexibility of a virtual environment.

In view of the above discussion, there exists a need for improvement in creation and presentation of animations in virtual environments.

SUMMARY OF THE INVENTION

In view of the above discussion, it is an object of the present invention to provide an animation in a virtual environment which appears properly oriented to a user throughout the environment.

A further object of the present invention is to provide properly oriented animations in a virtual environment without having to replicate the animation for each possible user point of view.

Yet another object of the present invention is to provide animations in a virtual environment without having to limit the locations in the virtual environment from which the animation may be viewed.

These and other objects of the present invention are provided by methods, systems and computer program products which display an animation in a three dimensional virtual environment by associating the animation with a parent transform such that the geometry of the animation is transformed so that the animation is viewed from a predefined point of view with respect to a user in the three dimensional virtual environment. The animation may, optionally, be played for the user when a user or a representation of the user is located in a predefined area of the three dimensional virtual environment. Preferably, the predefined point of view is facing the user. In a VRML embodiment of the present invention, the parent transform is a VRML billboard transform.

By associating an animation with a parent transform which re-orients the animation, a constant point of view to a user may be maintained. For example, utilizing a VRML billboard function, a child animation to the billboard function may be automatically re-oriented to a user's position so as to always present the animation head-on to the user. This re-orientation tracks the user as the user moves through the virtual environment such that a single animation may be used for differing locations and points of view in the virtual environment. Thus, by associating the billboard transformation with an animation to create a billboard node containing the animation the animation appears properly oriented to a user throughout the environment, the properly oriented animation is provided in the virtual environment without having to replicate the animation for each possible user point of view and the locations in the virtual environment from which the animation may be viewed are not limited.

In another embodiment of the present invention, an animation is controlled in a three dimensional virtual environment by creating an animation wherein the animation includes geometry to be animated and by creating a parent transform for the animation such that the parent transform repositions the geometry of the animation to provide a predefined point of view to a user. The position of a user in the three dimensional virtual environment may then be determined and the parent transform utilized to transform the animation to maintain the predefined point of view to the user based upon the position of the user in the three dimensional environment.

In a particular embodiment of the present invention, the animation is created by associating a VRML Timesensor and a VRML CoordinateInterpolator with the geometry to be animated. In such a VRML embodiment of the present invention, the parent transform repositions the VRML CoordinateInterpolator and VRML Timesensor to provide the predefined point of view to a user. Such a repositioning may be achieved utilizing a VRML billboard transform as the parent transform.

In another embodiment of the present invention, the animation is played for the user if it is determined that the location of the user is within a predefined area of the virtual environment. The animation may be played by starting the VRML TimeSensor for the animation if it is determined that the location of the user is within a predefined area of the virtual environment.

As will further be appreciated by those of skill in the art, the present invention may be embodied as a method, apparatus/system or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention provides for the display of animations in a three dimensional virtual environment. This virtual environment may be created by, for example, a web browser receiving a three dimensional home page from a network. A user may move throughout the virtual environment and have displayed to them an animation. The present invention assures that an animation provided to a user in a virtual environment is properly oriented to the user such that the user does not see the animation from an anomalous perspective. The present invention provides for displaying an animation to a user through a processing system having a display and user input devices such as is illustrated in FIG. 1 and described below.

Figure 1:
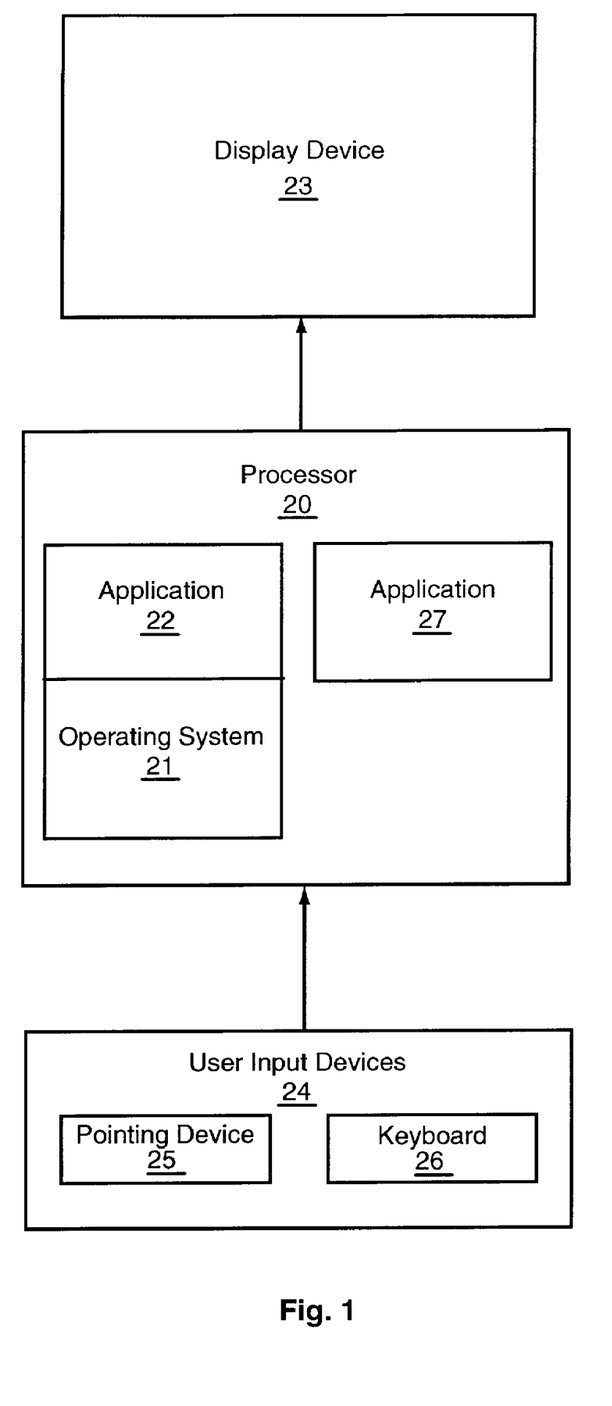
FIG. 1 is block diagram of a processing system utilizing the present invention.

FIG. 1 illustrates a data processing system on which virtual environments according to the present invention may be utilized. As seen in FIG. 1, a data processor 20 may have an operating system 21 resident in the processor. An application 22 may be running on the operating system 21. The processor 20 displays information on a display device 23. The display device 23 has a plurality of picture elements (collectively referred to as a screen) which may define the appearance of a user interface environment displayed on the display device. For each picture element a color characteristics of that element includes hue, brightness, and saturation values. By manipulation of these values for each picture element of the screen the appearance or contents of the screen is established. The contents of the screen of the display device 23 and, therefore, the appearance of the user interface environment, may be controlled or altered by the application 22 or the operating system 21 either individually or in combination.

For obtaining input from a user, the operating system 21, the application 22 or both may utilize user input devices 24. User input devices 24 may include a pointing device 25 and a keyboard 26 or other input devices known to those of skill in the art. User input devices 24 may be used to control movement throughout a virtual environment displayed on display device 23.

FIG. 1 also illustrates a communications interface 27 associated with the processor 20 which may be utilized to send and receive communications with devices external to the processing system. Communications interface 27 may be a network interface, a modem, a serial port, a parallel port or any other means of sending and receiving information.

When utilized in accordance with the present invention, the display device 23 displays a three dimensional view of a virtual environment. This three dimensional virtual environment may be generated by the application 22 or the operating system 21. The virtual environment may be utilized to display user selected information, information received over the communications interface 27, such as may be the case with a virtual environment of a web page on the Internet, or the virtual environment may be part of a user interface for the data processing system 20. Thus, the virtual environment may be generated utilizing information local to the data processing system 20 or the virtual environment may be generated utilizing information received by the data processing system 20 such as information received from a network to which the data processing system 20 has access.

In operation, the data processing system 20 displays the three dimensional virtual environment on the display device 23. A user then interacts in the virtual environment by providing user input, via an input device 24, which moves the user through the virtual environment. A user may be represented in the virtual environment by an avatar which is a representation of the user in the virtual environment which may be viewable by the user or other users in the virtual environment. A user may then utilize an avatar to interact with objects in the virtual environment or with other users in the virtual environment. Animations may then be presented to the user utilizing the teachings of the present invention as the user interacts in the virtual environment.

The data processing system illustrated in FIG. 1 may be utilized to create virtual environments, and in particular, virtual environments utilizing the present invention. These virtual environments may be created by the operating system 21 or the application 22. In one embodiment of the present invention, the virtual environment is created by a VRML browser receiving VRML information from either a local source or over a network such as the Internet. Thus, the data processing system may be utilized, as is discussed below, to create animations for use in three dimensional virtual environments.

The present invention will now be described with respect to FIG. 2 which is a flowchart illustrating one embodiment of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 2:
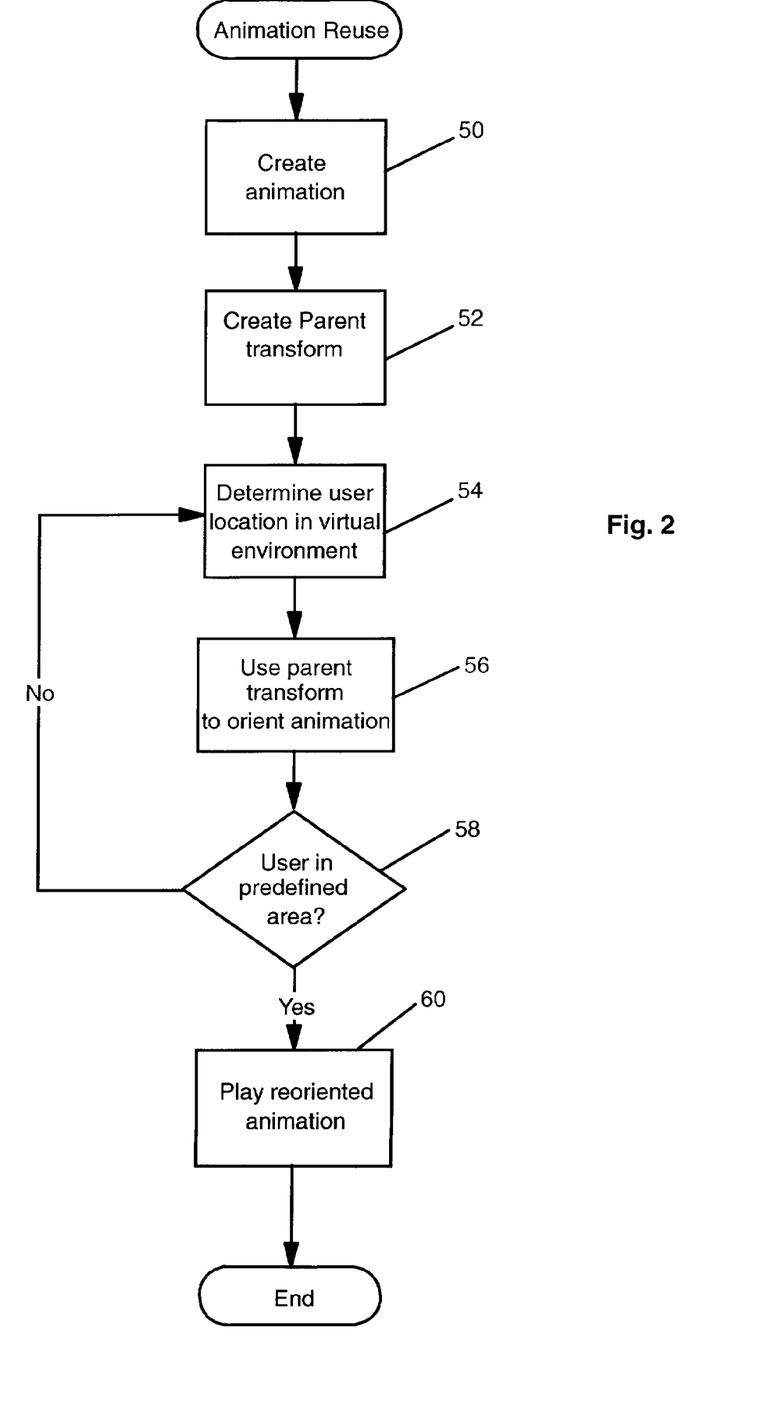
FIG. 2 is a flow chart of the operations of one embodiment of the present invention.

One embodiment of the present invention is illustrated in FIG. 2. As is seen in FIG. 2, an animation is created (block 50). The animation typically has associated with it a geometry which defines the appearance of the animation and a time sequence which defines the movement of the geometry. Thus, the combination the geometry and the time sequence may be considered the animation. In one embodiment, the animation is defined in the Virtual Reality Modeling Language (VRML). In such a case, the animation maybe defined by associating a VRML TimeSensor and CoordinateInterpolator with the geometry to be animated to produce an animation node. When the TimeSensor is started it creates time events which are input to the CoordinateInterpolator which then outputs position events (x, y, z) which are sent to the position transform for the geometry. The result of these operations is that the geometry moves to the new location (x, y, z) for each position event.

Returning to FIG. 2, the created animation node is associated with a parent transform (block 52) such that the geometry of the animation is transformed so that the animation is viewed from a predefined perspective with respect to an orientation of a representation of a user in the three dimensional virtual environment. In other words, the animation is associated with a transform which re-orients the geometry of the animation such that the animation is viewed from a fixed point of view by the user. One such transform would be a transform which oriented the animation so that the animation was always viewed as if the user were in front of the animation. In a VRML implementation of the present invention, the parent transform may be a billboard transform. Thus, the VRML animation may be associated with a VRML billboard transform so that a billboard node containing the animation node as a child is created. In such a case the animation is presented to the user from a predefined, head-on, perspective.

After creation of the animation and association of the animation with the parent transform, the application or operating system utilizing the animation and transform may monitor the location of a user in the virtual environment (block 54). This location may be utilized by the parent transform to re-orient the animation to the user. Based on the location of the user, then the animation is oriented by the parent transform (block 56) to the user. This orientation may be to the users location or may, in fact, be to the orientation of a representative of the user, such as an avatar, in the virtual environment. In the VRML context, the re-orientation is based upon the axis defined in the billboard node definition statement.

In the embodiment of the present invention illustrated in FIG. 2, the animation is not started until the user enters a predefined area or location in the virtual environment. Thus the application utilizing the animation may test the users location to determine if the user is in the predefined area (block 58) and only start the animation if the user is in the predefine area. The re-oriented animation is then played for the user (block 60).

As will be appreciated by those of skill in the art, the present invention may be utilized to display animations independent of the location of a user in the virtual environment in that a user need not move to a predefined location to have an animation displayed to the user or an animation played for the user. Furthermore, through the use of the present invention, a single animation may be reused for multiple users in differing locations without the need to create a properly oriented animation for each possible user location.

The reuse of the animation may be particularly useful in applications, such as in a virtual environment used as an Internet web page, where the virtual environment is transmitted to a remote user. Because of communication delays based upon the quantity of data transferred, it may be desirable to minimize the amount of data that needs to be transferred to a remote user to create the virtual environment. By reusing an animation for multiple locations and points of view the animation need only be transmitted to the remote user once. Thus, the present invention reduces the amount of data required to be transferred to a remote user for creation of a virtual environment which includes animations viewable from multiple locations in the virtual environment while assuring that the animations will be viewed from the proper point of view by the user.

The present invention is particularly useful in the creation of VRML virtual worlds. In such an application an animation is created as is described above. This animation is then incorporated into a billboard node utilizing the following syntax:

```
Billboard {
    eventIn       MFNode      addChildren
    eventIn       MFNode      removeChildren
    exposedField  SFVec3f     axisOfRotation    0 1 0
    exposedField  MFNode      children          []
    field         SFVec3f     bboxCenter        0 0 0
    field         SFVec3f     bboxSize          -1 -1 -1
}
``` where addchildren, removeChildren and children define grouping and children nodes, axisOfRotation defines the axis about which the billboard rotates (default=0,1,0) and the bboxCenter and bboxsize define a bounding rectangle that encloses the Billboard's children. By defining an animation as a child of the Billboard node and specifying a bounding box which includes the animation the resultant Billboard node will automatically re-orient the child animation to the users or location by rotating the animation about the axis of rotation.

Figure 3A:
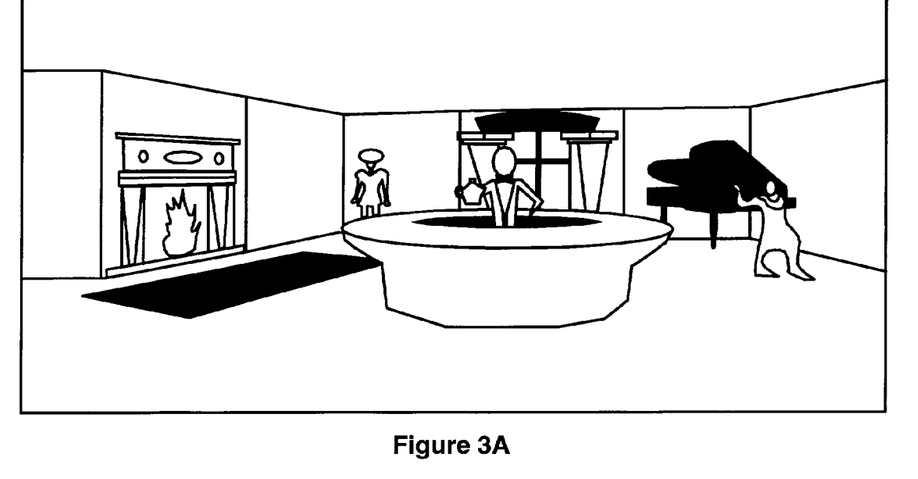
FIG. 3A through FIG. 3C are screen captures of an animation illustrating one embodiment of the present invention.
Figure 3B:
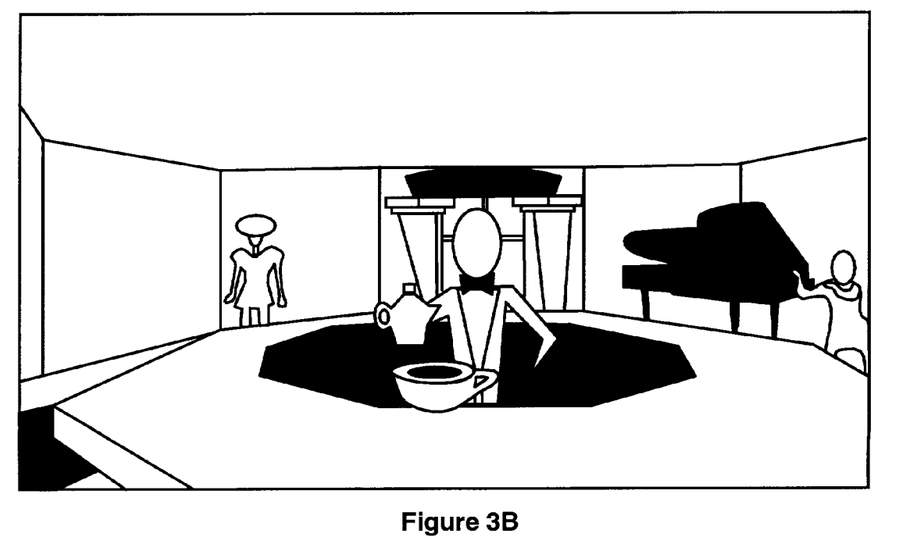
Figure 3C:
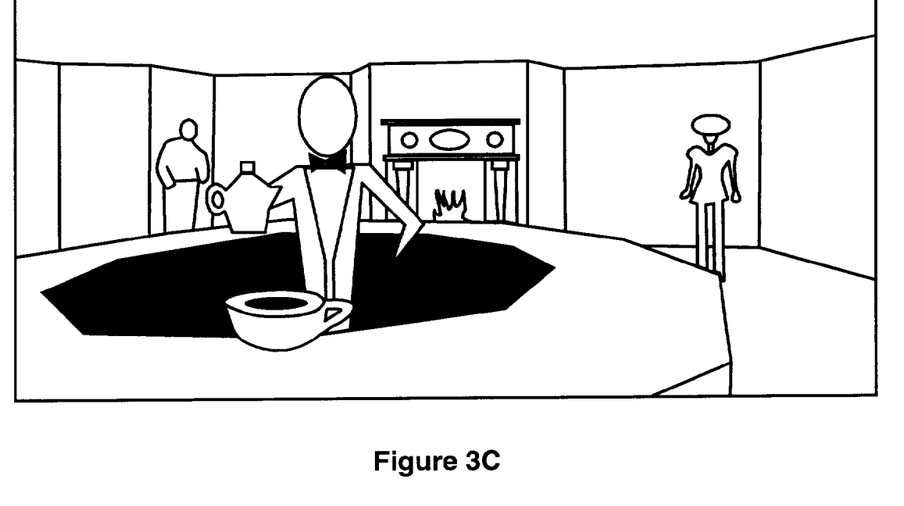

An example of the use of the VRML embodiment of the present invention is illustrated in FIGS. 3A through 3C which are screen captures of a virtual environment which may be displayed on display device 23 by processor 20 utilizing the present invention. As seen in FIG. 3A a virtual environment is created which includes a circular coffee bar and a single bartender. Other three dimensional objects are also included in the virtual environment such as a piano and a fireplace.

As a user moves throughout the virtual environment by providing input to processor 20 through input devices 24, the processor 20 revises what is displayed to the user through display device 23. Thus, the user, or their representation in the virtual environment, may approach the bar illustrated in FIG. 3A. When the user is at the bar the bartender animation is started to pour the user a cup of coffee. FIG. 3B illustrates the bartender beginning to pour a cup of coffee for a user which has approached the circular bar from the position of FIG. 3A. The bartender animation is defined as a billboard node with an axis of rotation perpendicular to the plane of the bar top. Thus, the bartender animation may rotate around the bar so as to always be looking out from the bar toward a user.

FIG. 3C illustrates a user approaching the bar from an angle and from a direction other than the direction of FIG. 3B. As is seen in FIG. 3C, the bartender is also oriented to face the user despite the user being angled toward the bar and approaching the bar from a different direction than the user approached the bar in FIG. 3B. The animation of the bartender would then pour the user a cup of coffee and the cup of coffee would be directed toward the user despite the user's changed orientation toward the bar. This re-orientation of the animation of the bartender is achieved with a single animation that has been associated with a billboard transform to create a billboard node. Thus, through utilization of the present invention, the bartender is rotated so that the bartender will always face a user no matter where the user approaches the circular bar.

While the present invention has been described with respect to a circular bar, as will be appreciated by those of skill in the art, the use of an animation in conjunction with any fixed geometry may be utilized as long as the fixed geometry is properly related to the rotation of the billboard node and thus the animation. Thus, a rectangular, square or other shape bar could be used in the present example as long as the counter area encompasses the circular radius of the animated geometry and the axis of rotation is selected in a plane perpendicular to the counter surface.

FIGS. 3A through 3C illustrate the use of the present invention to provide a single animation which may be reused for various users approaching the bar from differing locations. Thus, unlike previous methods of displaying animations, there is no need to create an animation for each possible orientation of a user to the animation. The problem of incorrect orientation when the animation is started resulting in the animation not being directed toward the user, i.e. pouring a cup of coffee to a non-existent user, is also eliminated by the proper orientation of the animation. Accordingly, there is no need to limit the locations from which an animation may be started to assure proper orientation to a user as the proper orientation will result from the use of the billboard transform.

The present invention has been described with respect to VRML and the VRML billboard node. However, as will be appreciated by those of skill in the art, other transforms may be utilized while still benefiting from the teachings of the present invention. Thus, for example, a parent transform could be utilized which allowed for multiple axis re-orientation.

Furthermore, the present invention has been described with respect to the point of view of a user. As will be appreciated by those of skill in the art, the point of view of a user may be the point of view of a browser operated by a user. Alternatively, an avatar or user representation may be utilized in the virtual environment. In such a case the point of view of the user may be the point of view of the user's representation in the virtual environment (e.g. the user's avatar). Similarly, while the present invention is described as a "user's location" as will be appreciated by those of skill in the art, such a reference is to a virtual location of a user in the virtual environment. Thus, the user's virtual location may be controlled by the user through, for example, the user's browser or other interface to the virtual environment.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of controlling an animation in a three dimensional virtual environment, the method comprising the steps of:
   creating an animation wherein the animation includes geometry to be animated;
   creating a parent transform for the animation such that the parent transform repositions the geometry of the animation to provide a predefined point of view to a user;
   determining a position of a user in the three dimensional virtual environment; and
   utilizing the parent transform to transform the animation to maintain the predefined point of view to the user based upon the position of the user in the three dimensional environment; and
   wherein said creating an animation step comprises creating an animation by associating a VRML Timesensor and a VRML CoordinateInterpolator with the geometry to be animated; and
   wherein said creating a parent transform step comprises the step of creating a parent transform for the animation such that the parent transform repositions the VRML CoordinateInterpolator and VRML Timesensor to provide the predefined point of view to a user.

2. The method according to claim 1, wherein the parent transform comprises a VRML billboard transform.

3. The method according to claim 1, further comprising the step of:
   playing the animation for the user if said determining step determines that the location of the user is within a predefined area of the virtual environment.

4. The method according to claim 1, further comprising the step of:
   starting the VRML TimeSensor for the animation if said determining step determines that the location of the user is within a predefined area of the virtual environment.

5. A system for controlling an animation in a three dimensional virtual environment, the system comprising:
   means for creating an animation wherein the animation includes geometry to be animated;
   means for creating a parent transform for the animation such that the parent transform repositions the geometry of the animation to provide a predefined point of view to a user;
   means for determining a position of a user in the three dimensional virtual environment;
   means for utilizing the parent transform to transform the animation to maintain the predefined point of view to the user based upon the position of the user in the three dimensional environment;
   wherein said means for creating an animation comprises means for creating an animation by associating a VRML Timesensor and a VRML CoordinateInterpolator with the geometry to be animated; and
   wherein said means for creating a parent transform step comprises means for creating a parent transform for the animation such that the parent transform repositions the VRML CoordinateInterpolator and VRML Timesensor to provide the predefined point of view to a user.

6. The system according to claim 5, wherein the parent transform comprises a VRML billboard transform.

7. The system according to claim 5, further comprising:
   means for playing the animation for the user if said means for determining determines that the location of the user is within a predefined area of the virtual environment.

8. The system according to claim 5, further comprising:
   means for starting the VRML TimeSenors for the animation if said determining step determines that the location of the user is within a predefined area of the virtual environment.

9. A computer program product for controlling an animation in a three dimensional virtual environment, the computer program product comprising:
   a computer readable storage medium having computer-readable program code means embodied in said medium, said computer-readable program code means comprising:
   computer-readable program code means for creating an animation wherein the animation includes geometry to be animated;
   computer-readable program code means for creating a parent transform for the animation such that the parent transform repositions the geometry of the animation to provide a predefined point of view to a user;
   computer-readable program code means for determining a position of a user in the three dimensional virtual environment;
   computer-readable program code means for utilizing the parent transform to transform the animation to maintain the predefined point of view to the user based upon the position of the user in the three dimensional environment;
   wherein said computer-readable program code means for creating an animation comprises computer-readable program code means for creating an animation by associating a VRML Timesensor and a VRML CoordinateInterpolator with the geometry to be animated; and
   wherein said computer-readable program code means for creating a parent transform step comprises computer-readable program code means for creating a parent transform for the animation such that the parent transform repositions the VRML CoordinateInterpolator and VRML Timesensor to provide the predefined point of view to a user.

10. The computer program product according to claim 9, wherein the parent transform comprises a VRML billboard transform.

11. The computer program product according to claim 9, further comprising:

computer-readable program code means for playing the animation for the user if said computer-readable program code means for determining determines that the location of the user is within a predefined area of the virtual environment.

12. The computer program product according to claim 9, further comprising:

computer-readable program code means for starting the VRML TimeSensor for the animation if said determining step determines that the location of the user is within a predefined area of the virtual environment.

* * * * *